United States Patent
Vasu (10) Patent No.: US 12,470,426 B2
(45) Date of Patent: Nov. 11, 2025

(54) VEHICLE VARIANT-AWARE SERVICES

(71) Applicant: Ford Global Technologies, LLC, Dearborn, MI (US)

(72) Inventor: Aishwarya Vasu, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 834 days.

(21) Appl. No.: 17/712,615

(22) Filed: Apr. 4, 2022

(65) Prior Publication Data

US 2023/0318872 A1    Oct. 5, 2023

(51) Int. Cl.
| | |
|---|---|
| *B60R 25/20* | (2013.01) |
| *B60R 25/24* | (2013.01) |
| *H04L 9/40* | (2022.01) |
| *H04L 12/40* | (2006.01) |
| *H04L 67/2871* | (2022.01) |

(52) U.S. Cl.
CPC ............ *H04L 12/40* (2013.01); *B60R 25/209* (2013.01); *B60R 25/24* (2013.01); *H04L 63/0281* (2013.01); *H04L 67/2871* (2013.01); *H04L 2012/40273* (2013.01)

(58) Field of Classification Search
CPC . H04L 12/40; H04L 63/0281; H04L 67/2871; H04L 2012/40273; H04L 12/40143; H04L 2012/40215; H04L 2012/40234; H04L 67/12; H04L 1/0061; H04L 41/5003; H04L 63/0428; H04L 67/125; B60R 25/209; B60R 25/24
See application file for complete search history.

(56) References Cited

U.S. PATENT DOCUMENTS

| | | | |
|---|---|---|---|
| 6,198,996 B1* | 3/2001 | Berstis | B60R 25/2081 726/20 |
| 10,999,312 B2 | 5/2021 | Viswambharan et al. | |
| 11,104,245 B2 | 8/2021 | Penilla et al. | |
| 2009/0284359 A1* | 11/2009 | Huang | B60R 25/24 340/5.2 |
| 2014/0309892 A1* | 10/2014 | Ricci | B60W 50/14 701/49 |

(Continued)

FOREIGN PATENT DOCUMENTS

CN    112055091 A    12/2020

OTHER PUBLICATIONS

Lithia Motors, How to Decode your Car's VIN Number, Oct. 13, 2021 (Year: 2021).*

*Primary Examiner* — James J Lee
*Assistant Examiner* — Andrew Sang Kim
(74) *Attorney, Agent, or Firm* — Christopher Storms; Brooks Kushman P.C.

(57) ABSTRACT

A system includes a processor to execute instructions to, upon instantiation of a control application in a vehicle, retrieve (a) configuration data specifying one or more features available to the control application in the vehicle, and (b) settings data specifying one or more current settings for the control application; monitor a vehicle network for request from a remote device for a selected feature of the control application in the vehicle; determine from the configuration data whether the selected feature is included in the one or more features available to the control application in the vehicle; and, if the selected feature is included, actuate a component in the vehicle based on the selected feature and the settings data.

18 Claims, 5 Drawing Sheets

(56) References Cited

U.S. PATENT DOCUMENTS

| | | | |
|---|---|---|---|
| 2015/0057839 A1* | 2/2015 | Chang | B60R 16/0373 |
| | | | 701/2 |
| 2015/0088337 A1* | 3/2015 | Toohy | B60R 16/037 |
| | | | 701/1 |
| 2019/0291719 A1* | 9/2019 | Tiziani | B60K 35/22 |
| 2021/0042160 A1 | 2/2021 | Alamouti et al. | |
| 2021/0192867 A1* | 6/2021 | Fang | G07C 5/0816 |
| 2022/0089192 A1* | 3/2022 | Gyllenhammar | |
| | | | B60W 60/0059 |

* cited by examiner

VEHICLE VARIANT-AWARE SERVICES

BACKGROUND

Automotive capabilities and features for a vehicle may be delivered in the form of services provided by applications. Vehicle services, for example, operation of a vehicle component, can be requested by user input to an application provided on a user device or via a vehicle user interface, e.g., to start a vehicle, unlock a door or trunk, open or close a window, activate a climate control system, etc. The applications delivering these services may be developed using principles and recommendations for various priorities, such as ASIL classifications, and can be provided in part according to operation of an Electronic Control Unit (ECU) of the vehicle.

DETAILED DESCRIPTION

In an implementation, a user may remotely control a vehicle component, such as open a trunk or remotely start the vehicle, via a control application in the vehicle. The control application can retrieve (a) configuration data specifying one or more features available to the specific vehicle, and (b) settings data specifying one or more current settings of the vehicle. The control application monitors a network in the vehicle, and when a request involving a selected feature is received from a remote device such as the user's smartphone, the control application can determine from the configuration data whether the selected feature is included in the specific vehicle. If the selected feature is included, the control application can actuate a component in the vehicle based on the selected feature and the settings data.

Vehicle Electronic Control Units (ECUs) connected to the network may be used to actuate a component in the vehicle. Connecting vehicle ECUs, that have traditionally been connected using Controller Area Network (CAN bus), to instead use Ethernet protocol (IEEE 802.3) communication can achieve better network bandwidth and faster response times. On such platforms, service-oriented communication that follows a publish-subscribe model has proven to be very reliable and scalable across a vehicle and cloud infrastructure. However, reliability and scalability can suffer when prioritizing application communications and recommendations across vehicle variants. A vehicle variant is a type of vehicle of vehicle specified by one or more attributes, e.g., a manufacturer, a model, a trim level, etc., For example, vehicles utilizing various application services may come in a wide variety of variants based upon styles (e.g., pickup, SUV, sedan, coupe, etc.), models (e.g., F-150, Explorer, Mustang, etc.), trim levels (XL, XLT, Lariat, Titanium, etc.) and equipment packages/options (e.g., Technology, Towing, Moonroof, leather seating, etc.), herein referred to as vehicle variants. Not only do different vehicle variants present challenges for scalability and reliability of applications providing vehicle services, but developing applications to deliver services to each vehicle variant requires additional resources.

In an implementation, a system has a computing device including a processor and a memory, the memory storing instructions executable by the processor, with the instructions including instructions to, upon instantiation of a control application in a vehicle, retrieve (a) configuration data specifying one or more features available to the control application in the vehicle, and (b) settings data specifying one or more current settings for the control application. The system also has instructions to monitor a vehicle network for request from a remote device for a selected feature of the control application in the vehicle, determine from the configuration data whether the selected feature is included in the one or more features available to the control application in the vehicle, and, if the selected feature is included, actuate a component in the vehicle based on the selected feature and the settings data.

The configuration data may be determined based on a type of the vehicle.

The configuration data may indicate a year, model, trim, and optional equipment of the vehicle.

The settings data may include a value determined based on user input.

The control application may be executable by the computing device.

An implementation may further include an electronic control unit (ECU) communicatively coupled to the computing device, wherein the control application is executable by the ECU.

The ECU and the computing device may be communicatively coupled in a mesh Ethernet network.

The computing device may be an electronic control unit (ECU) for a vehicle.

The configuration data may include priority data for the one or more features.

The instructions may further include instructions to block a request for the selected feature determined to be invalid based on the priority data.

The instructions may further include instructions to increment a count of requests for features that are determined to be invalid, and to output a notification upon the count meeting a predetermined threshold.

The computing device may include a proxy to retrieve the configuration data, the settings data, and monitor the vehicle network.

The computing device may include a proxy to prioritize communications and recommendations based upon priority level of a service or component.

The control application may be one of a plurality of control applications in the vehicle.

In another implementation, a method for providing a service to a vehicle utilizing service-oriented communication includes executing logic of the service for the vehicle in a service component based upon received commands, executing networking for the service in a networking component of a proxy component, monitoring communication among different or same priority components and/or services in a priority component of the proxy component, enabling/disabling Application Programming Interfaces (APIs) offered by the service based on vehicle configuration data retrieved by a configuration component of the proxy component, and applying certain default values for resources based at least in part on information received from vehicle configuration data retrieved by a calibration component of the of the proxy component, wherein the networking component, priority component, configuration component, and calibration component of the proxy component are interconnected by a proxy.

The method may further include providing end-to-end protection mechanisms selected from Cyclic Redundancy Check (CRC) computation, CRC checks, and encryption and decryption of data at both sender and receiver endpoints with the networking component.

Monitoring communication among priority components may include logging invalid access requests.

Monitoring communication among priority components may further include blocking invalid access requests.

Monitoring communication among priority components may further include incrementing a count of the invalid access requests, and reporting the invalid access requests upon reaching a predetermined count.

In the method, executing the logic may operate an actuator of the vehicle.

Figure 1:
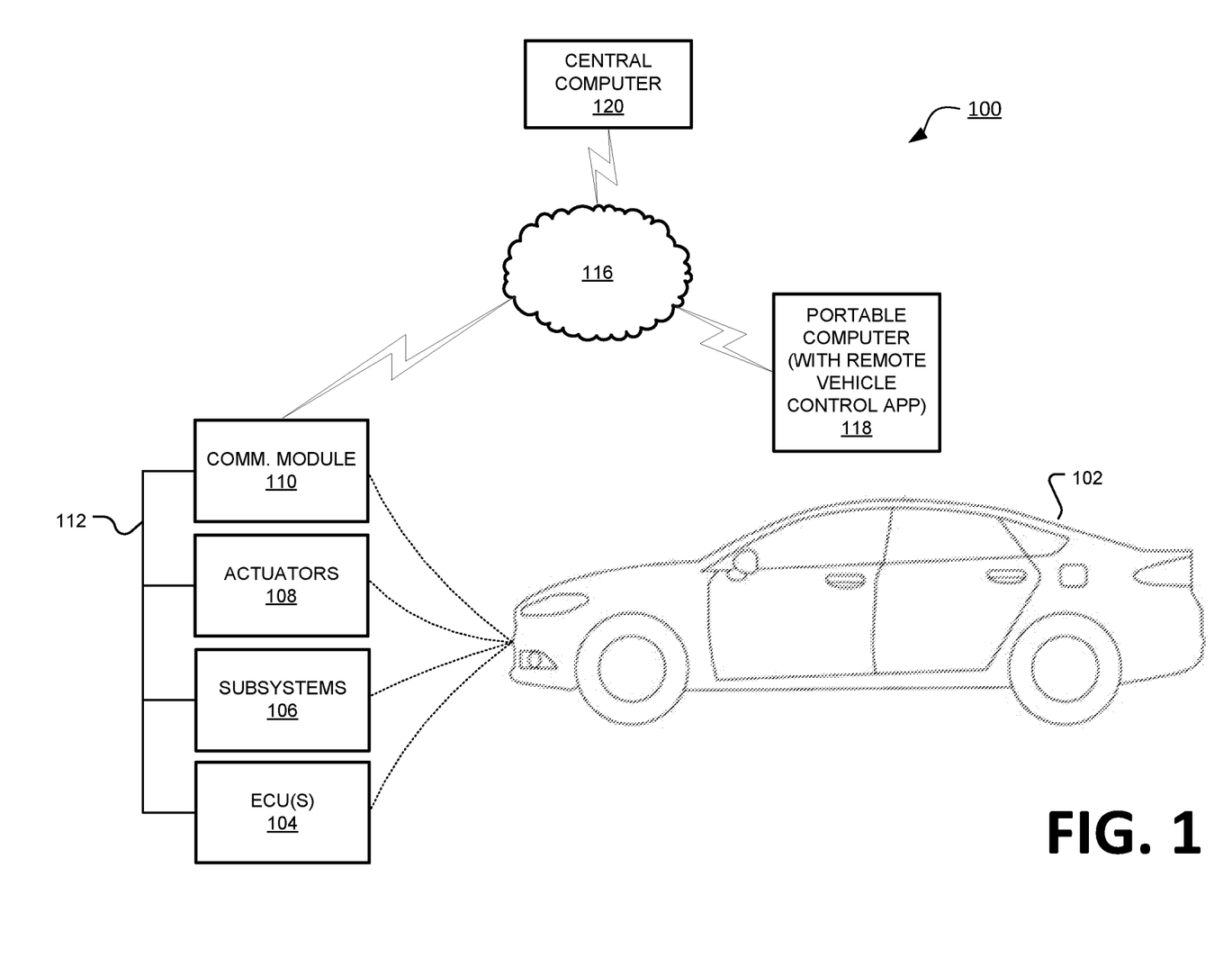
FIG. 1 illustrates a connected vehicle system usable with implementations of the inventive concepts.

With reference to FIG. 1, a connected vehicle system 100 can provide communications between vehicle 102 and one or more portable computers 118, and a central computer 120 to provide access to various vehicle services using a vehicle control application (app) installed on a portable computer 118 of a user, such as a smartphone or tablet. The portable computer 118 can communicate directly or indirectly with vehicle 102, as will be discussed in further detail.

Figure 2A:
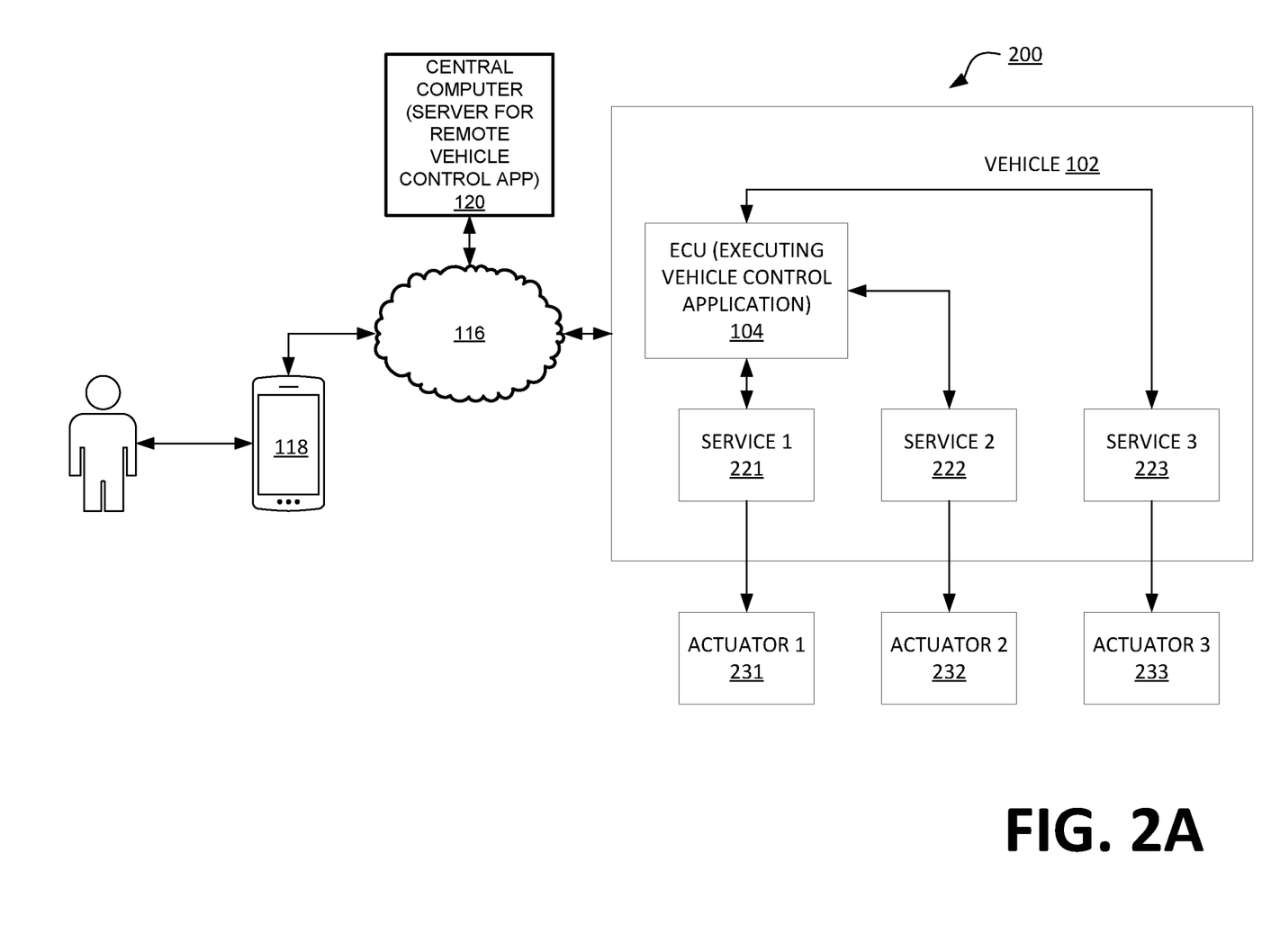
FIG. 2A illustrates an example use case for an implementation of service-oriented communication system.

Vehicle 102 is a set of components or parts, including hardware components, and typically also software and/or programming, to perform a function or set of operations in the vehicle 102. Vehicle subsystems 106 including vehicle components (e.g., actuators 231, 232, 233 illustrated in FIG. 2) typically include a braking system, a propulsion system, and a steering system as well as other subsystems including but not limited to a body control system, a climate control system, a lighting system, and an infotainment system. The propulsion subsystem converts energy to rotation of vehicle 102 wheels to propel the vehicle 102 forward and/or backward. The braking subsystem can slow and/or stop vehicle 102 movement. The steering subsystem can control a yaw, e.g., turning left and right, maintaining a straight path, of the vehicle 102 as it moves. Other examples of subsystems 106 can include a climate control subsystem, a body control subsystem (e.g., controlling locking/unlocking and opening/closing or vehicle doors, windows, compartment hatches such as trunk lid and/or hood), an infotainment subsystem, and ignition control subsystem, a fuel control subsystem, etc.

Computers, including the herein-discussed one or more vehicle computers in the form of electronic control units (ECUs) 104, portable computer 118, and central computer 120, include respective processors and memories. A computer memory can include one or more forms of computer readable media, and stores instructions executable by a processor for performing various operations, including as disclosed herein. For example, the computer can be a generic computer with a processor and memory as described above and/or an ECU, controller, or the like for a specific function or set of functions, and/or a dedicated electronic circuit including an ASIC that is manufactured for a particular operation, e.g., an ASIC for processing sensor data and/or communicating the sensor data. In another example, computer may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in a computer.

A computer memory can be of any suitable type, e.g., EEPROM, EPROM, ROM, Flash, hard disk drives, solid state drives, servers, or any volatile or non-volatile media. The memory can store data, e.g., a memory of an ECU 104. The memory can be a separate device from the computer, and the computer can retrieve information stored in the memory, e.g., one or more ECUs 104 can obtain data to be stored via a vehicle network 112 in the vehicle 102, e.g., over an Ethernet bus, a CAN bus, a wireless network, etc. Alternatively, or additionally, the memory can be part of the computer, i.e., as a memory of the computer or firmware of a programmable chip.

The one or more ECUs 104 can be included in a vehicle 102 that may be any suitable type of ground vehicle 102, e.g., a passenger or commercial automobile such as a sedan, a coupe, a truck, a sport utility, a crossover, a van, a minivan, etc. An ECU 104 may include programming to operate one or more of vehicle 102 brakes, propulsion (e.g., control of acceleration in the vehicle 102 by controlling one or more of an internal combustion engine, electric motor, hybrid engine, etc.), steering, climate control, interior and/or exterior lights, etc., as well as to determine whether and when the computer, as opposed to a human operator, is to control such operations. Additionally, an ECU 104 or other computer may be programmed to determine whether and when a human operator is to control such operations.

An ECU 104 may include or be communicatively coupled to, e.g., via a vehicle network 112, such as a communications bus as described further below, more than one processor, e.g., included in components such as actuators 108, electronic controller units (ECUs) or the like included in the vehicle 102 for monitoring and/or controlling various vehicle components, e.g., a powertrain controller, a brake controller, a steering controller, etc. The ECUs 104 are generally arranged for communications on a vehicle communication network 112 that can include a bus in the vehicle 102, such as Ethernet (IEEE 802.3), a controller area network (CAN) or the like, and/or other wired and/or wireless mechanisms.

Various controllers and/or actuators 108 may receive data from one or more ECUs 104 via the vehicle 102 communication network. Vehicles 102 typically include a variety of actuators 108. Some actuators 108 may also include sensors to detect internal states of actuated devices of the vehicle 102, for example, wheel speed, wheel orientation, and engine and transmission variables. Other actuators 108 may control the status of various components, such as ignition switch status, audio volume status, etc. Often, but not necessarily, an actuator includes a digital-to-analog converter to convert a digital control signal that can be provided from a digital computer, e.g., via a network, to an analog signal that is usable by an analog control device such as a relay or solenoid.

A vehicle network 112 is a network via which messages can be exchanged between various devices in vehicle 102. The ECUs 104 can be generally programmed to send and/or receive, via vehicle network 112, messages to and/or from other devices in vehicle 102 e.g., any or all of ECUs 104, actuators 108, components, communications module 110, subsystems 106, a human machine interface HMI, etc. Additionally, messages can be exchanged among various such other devices in vehicle 102 via the vehicle network 112. Further, as mentioned below, various controllers and/or actuators 108 may receive and provide data to the ECUs 104. In some implementations, vehicle network 112 can be a network in which messages are conveyed via a vehicle 102 communications bus. For example, vehicle network 112 can include an Ethernet network, a controller area network (CAN) in which messages are conveyed via a CAN bus, or a local interconnect network (LIN) in which messages are conveyed via a LIN bus. In some implementations, vehicle network 112 can include a network in which messages are conveyed using other wired communication technologies and/or wireless communication technologies e.g., Ethernet, WiFi, Bluetooth, Ultra-Wide Band (UWB), etc. Additional examples of protocols that may be used for communications over vehicle network 112 in some implementations include, without limitation, Media Oriented System Transport (MOST), Time-Triggered Protocol TTP, and FlexRay. In some implementations, vehicle network 112 can represent a combination of multiple networks, possibly of different types, that support communications among devices in vehicle 102. For example, vehicle network 112 can include a CAN in which some devices in vehicle 102 communicate via a CAN bus, and a wired or wireless local area network in which some device in vehicle 102 communicate according to Ethernet or Wi-Fi communication protocols.

The ECUs 104, portable computer 118, and/or central computer 120 can communicate via a wide area network 116, for example the Internet. Further, various computing devices discussed herein may communicate with each other directly, e.g., via direct radio frequency communications according to protocols such as BLUETOOTH or the like. For example, a vehicle 102 can include a communication module 110 to provide communications with devices and/or networks not included as part of the vehicle 102, such as the wide area network 116 and/or a portable computer 118, for example. The communication module 110 can provide various communications, e.g., vehicle to vehicle (V2V), vehicle-to-infrastructure or everything (V2X) or vehicle-to-everything including cellular communications (C-V2X) wireless communications cellular, dedicated short range communications (DSRC), etc., to another vehicle 102, to an infrastructure element typically via direct radio frequency communications and/or typically via the wide area network 116, e.g. to the central computer 120. The communication module 110 could include one or more mechanisms by which a vehicle computer such as an ECU 104 may communicate, including any desired combination of wireless e.g., cellular, wireless, satellite, microwave and radio frequency communication mechanisms and any desired network topology or topologies when a plurality of communication mechanisms are utilized. Exemplary communications provided via the module can include cellular, Bluetooth, IEEE 802.11, DSRC, cellular V2X, CV2X, and the like.

The portable computer 118 may include a smartphone, tablet, smartwatch, or other suitable portable computing device. The portable computer 118 may use any suitable wireless communications, such as cellular or WI-FI, to communicate with the central computer 120 via the wide area network 116.

The portable computer 118 may include a vehicle control application (app) to provide services, typically in conjunction with a server application running on a central computer 120, and interact with a vehicle control application (app) running on an ECU 104 of the vehicle 102 through use of vehicle communication system 100.

FIG. 2A illustrates an example service delivery communication system 200. A "service" or "services" in the context of this disclosure means actuation of one or more actuators 108 for various vehicle components using a portable computer 118. For example, a remote start service for a vehicle can allow a user to control an actuator (see actuator 108 of FIG. 1) of a vehicle's ignition ON and OFF states via an application on a portable computer 118 such as a smartphone. Such an application may be referred to as a remote vehicle control app.

A user may interact with the remote vehicle control app on portable computer 118 to communicate service commands over a wide area network 116 to a central computer 120 with a server application that includes programming to receive commands from the remote vehicle control app. Authenticated/permitted service commands may be forwarded by the central computer to an ECU 104 executing a vehicle control application in vehicle 102. Service commands may be provided for one or more services among, for example, a first service 221, a second service 222, and a third service 223. The services 221, 222, and 223 may relate to control of one or more respective actuators 108 that may be activated by an ECU 104, for example, first actuator 231, second actuator 232, and third actuator 233. As mentioned above, actuators 231, 232, 233 can be components in various subsystems 106. In an example of a remote start service, first service 221 may be an ignition service and actuator 231 may be an ignition switch, second service 222 may be a fuel control service and actuator 232 may operate a fuel pump and/or electronic fuel injection (EFI) system, and third service 223 may relate to an immobilization service and actuator 233 may operate to lock the doors and/or transmission of vehicle 102 to avoid theft of the running vehicle.

In a centralized architecture using a client-server model, individual clients/nodes connect to a server/broker, and components adopt a publish-subscribe pattern of communication. The centralized server/broker is responsible for coordinating all the requests from the nodes/clients and dispatches the responses/statuses to subscribed nodes/clients. These nodes/clients synchronize themselves with a global clock which is usually managed by the server/broker. Security in a centralized system is easily achieved since the authentication and authorization of clients/nodes are managed by the server/broker. Clients/nodes can easily be added or removed from the system since the server/broker maintains the overall coordination and orchestration. However, applications and the overall system may fail if the clients/nodes lose network connectivity, and failure of the server/broker may lead to the overall system failure. Additionally, the server/broker may get overloaded as many clients/nodes are added to the system, and clients/nodes may experience high communication overheads. Thus, scalability may be difficult to achieve even with large amounts of hardware and software resources.

In contrast, a distributed system adopts a peer-to-peer architectural model where individual client/nodes connect to the network and all clients/nodes work toward achieving a common goal. These individual clients/nodes, lacking a global clock, achieve concurrency by use of transaction IDs. Such a distributed system may achieve low latency and high scalability since there is no server/broker coordinating communication. However, it is difficult to achieve synchronization among services, and logging the time of certain events may be hard due to the absence of a global clock. Indeed, when the services are hosted by different ECUs 104, they will not have a common clock.

A software component participating in service-oriented communication is responsible for: (i) logic for the proposed service; (ii) establishing communication with other services (service discovery); (iii) implementing message routing logic; (iv) implementing authentication and authorization mechanisms for security; and (v) implementing error handling mechanisms (timeout handling, retries, etc.).

Establishing and maintaining peer-to-peer communication in a distributed system is challenging. Since the services participating in service-oriented communication on the distributed system have similar network, security, and error handling requirements in addition to the logic, it is beneficial to decouple the logic from network/security/error handling from services. This is achieved using a service mesh architecture in which the logic is contained within the service component and all the network critical functionalities are handled by a proxy component.

Figure 2B:
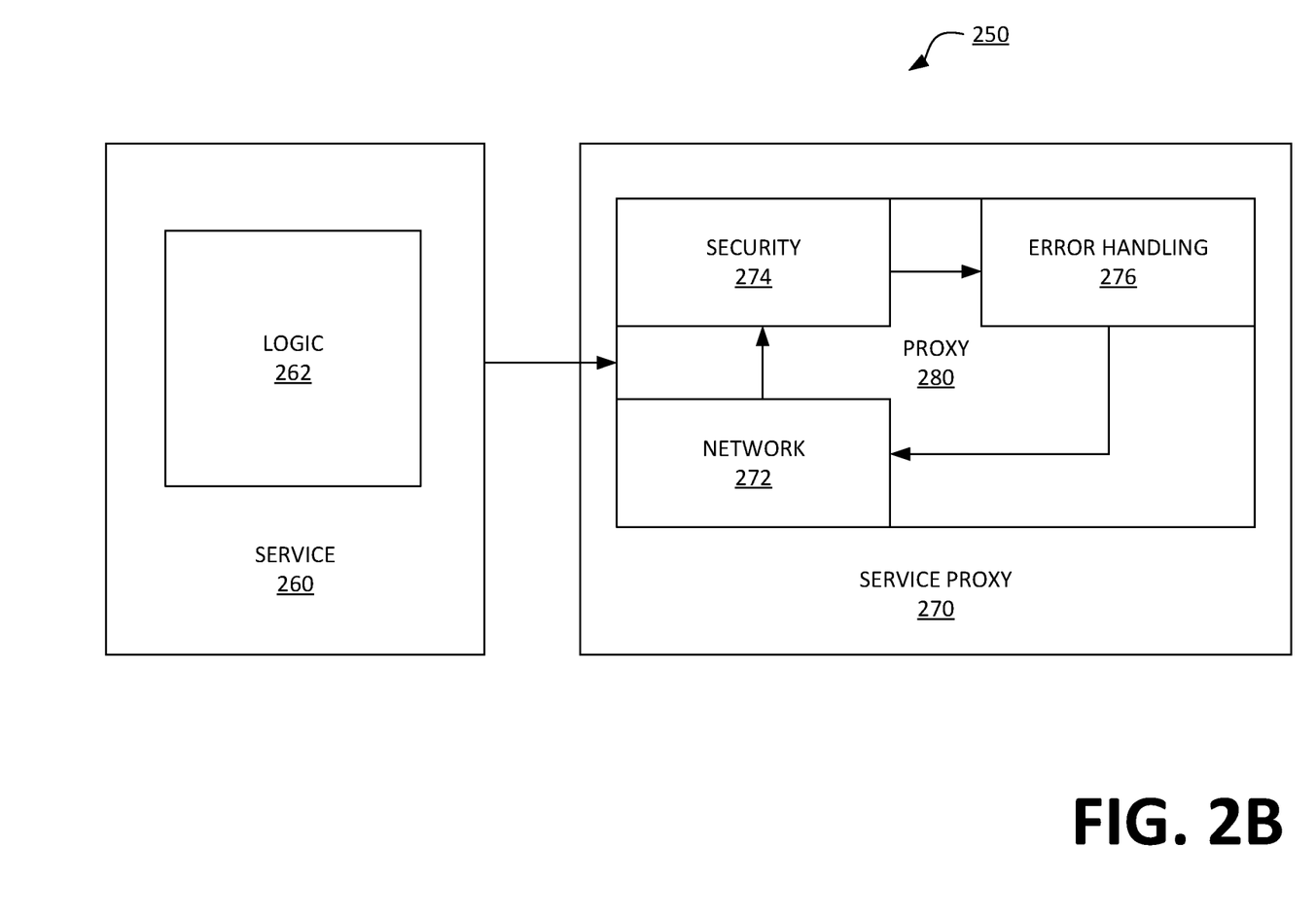
FIG. 2B illustrates an implementation of a service mesh architecture.

FIG. 2B illustrates an implementation of a service mesh architecture 250, in which the logic 262 is contained within the service 260 component and all the network critical functionalities are handled by a service proxy 270 component. As used in this disclosure, a proxy or proxy component refers to a software layer or module that acts as an intermediary between components requesting resources and components providing resources. The service 260 component will typically be hosted on an ECU 104 capable of activating the actuator(s) 108 associated with the service In a service mesh architecture, services do not communicate directly with each other. Service requests/responses are routed through the service proxies 270. A network 272 component of the service proxy 270 is responsible for functions such as service discovery, service registration, resiliency, logging, load balancing, etc. For example, service discovery may be achieved by using appropriate topics in a Data Distribution Service (DDS). However, this disclosure is not limited to a specific protocol such as DDS or Scalable service-Oriented MiddlewarE over IP (SOME/IP), and any other suitable service-oriented protocol that supports peer-to-peer communication can be used. Error handling 276 component is responsible for functions such as fault detection and handling, retries upon a timeout, logging, etc. Security 274 component of the service proxy 270 is responsible for functions such as TLS, key management, access control (authorization and authentication), etc. The network 272, security 274, and error handling 276 components in service proxy 270 are interconnected by proxy 280

This service mesh architecture 250 avoids most of the problems associated with network 272 issues and error handling 276 since they are central to the proxy 280 of the service proxy 270 alone. Debugging service implementations is also easier in this service mesh architecture 250. However, achieving and guaranteeing priority communications and recommendations, e.g., according to ASIL (Automotive Safety Integrity Level) ratings, on such a service mesh architecture 250 can be difficult in, or lacking from service mesh architecture 250. Moreover, service mesh architecture 250 may not offer sufficient scalability for different vehicle variants and configurations.

Figure 3:
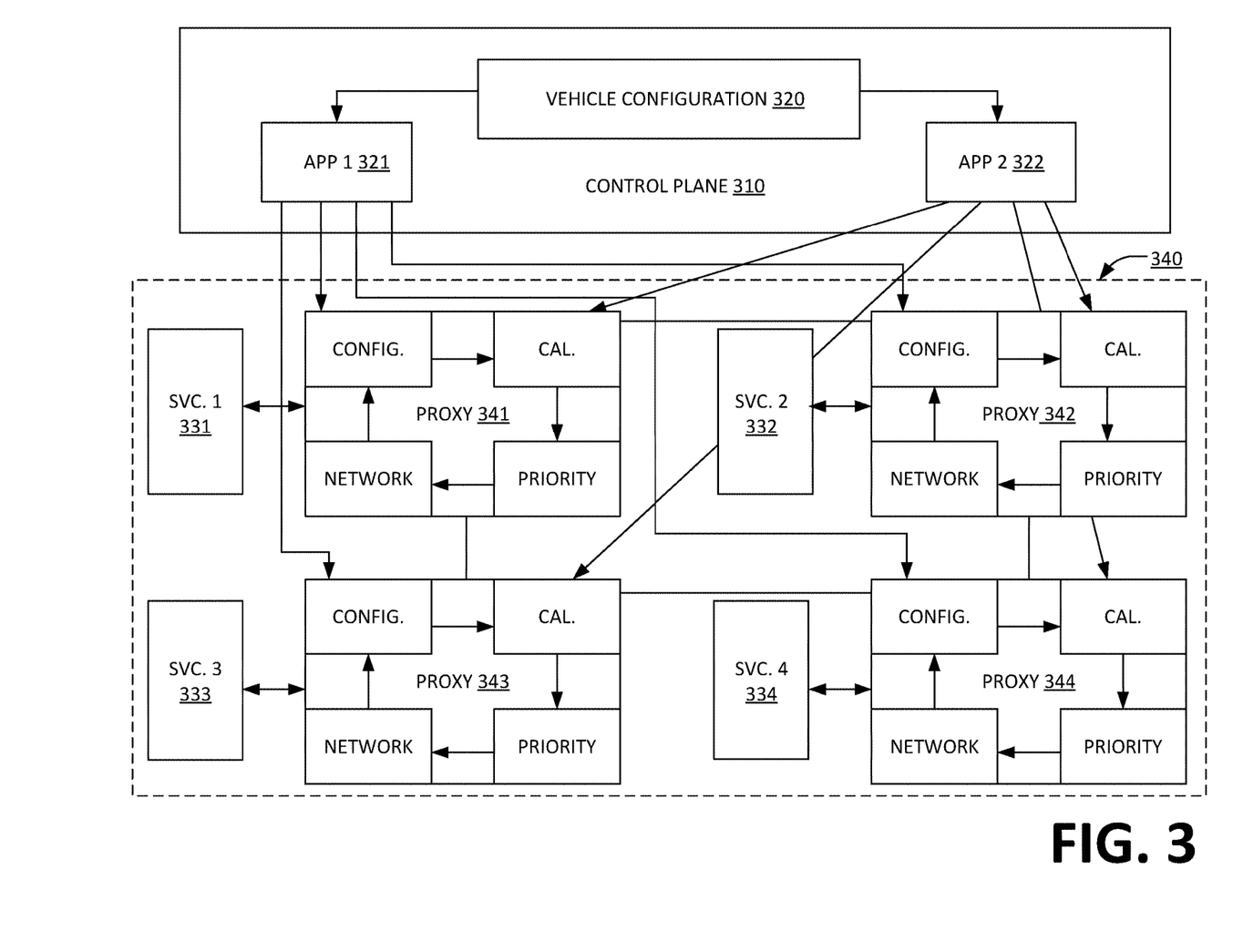
FIG. 3 illustrates an implementation of a vehicle variant aware service mesh architecture for vehicle services utilizing service-oriented communication.

FIG. 3 illustrates an implementation of a vehicle variant-aware service mesh architecture 300 for vehicle services utilizing service-oriented communication. In an implementation, a control plane 310, i.e., the portion of executing software that provides, and/or controls the flow of, data to and from data plane 340, may be established for in-vehicle host applications on an ECU 104, for example, an ECU for cloud services including App 1 and App 2. The control plane 310 may include a vehicle configuration 320 that may be accessed by applications, such as first app 321 and second app 322, to be shared with various services SVC 1 331, SVC 2 332, SVC 3 333, SVC 4 334, etc. within the data plane 340, i.e., the portion of executing software that processes the data requests/commands, of the vehicle variant-aware service mesh architecture 300.

As with the service mesh architecture 250, each of the first to fourth service 331, 332, 333, and 334 components include the logic of the respective service, which is decoupled from the proxy 341, 342, 343, and 344 of the services. Similarly, the proxy 341, 342, 343, and 344 of the services include a network component as found in the service mesh architecture 250. However, in the vehicle variant-aware service mesh architecture 300, the proxy 341, 342, 343, and 344 of the services include additional components not found in the service mesh architecture 250 of FIG. 2B.

As shown in FIG. 3, in the vehicle variant-aware service mesh architecture 300, the proxy 341, 342, 343, and 344 of the services further include a priority component, a configuration component to filter the service features based on vehicle configuration data, and a calibration component to apply certain default values for resources. The vehicle configuration data is vehicle-specific and specifies the features available to one or more control applications based upon the particular vehicle variant (e.g., year, model, trim, and optional equipment). For example, if a control application is programmed to permit remote opening of a sunroof, the configuration data could specify whether or not the vehicle has a sunroof or not. The default values may include settings data specifying one or more current settings of the specific vehicle (e.g., drive mode, ambient lighting setting, instrument panel settings, etc.).

The priority component of proxy 341, 342, 343, and 344 can monitor communication among components and/or services having different priorities and add end-to-end protection mechanisms as recommended by ISO 26262. Examples include, but are not limited to, Cyclic Redundancy Check (CRC) computation, CRC checks, and encryption and decryption of data at both sender and receiver endpoints. The priority component also logs invalid accesses by services with different priorities. Such logs can be used later for analysis within a cloud environment and can permit central computer 120 to track any invalid or malicious attacks that may happen within the vehicle 102. This collected data can be useful for avoiding such attacks in future. The priority component may also block invalid access requests and/or count the number of invalid access requests and report the offending application or be used to plan API improvements to prevent such invalid access requests in the future.

The configuration component of proxy 341, 342, 343, and 344 retrieves the configuration data for the vehicle variant and enables/disables Application Programming Interfaces (APIs) offered by the service. For example, on a vehicle without a frunk (i.e., trunk in front), APIs related to a frunk such as "OpenFrunk" and "CloseFrunk" will be disabled. Thus, the service users will only be able to invoke the APIs that are relevant to the current vehicle configuration. This permits the programming developed for services to be used in multiple vehicles, yet be customized to a particular vehicle variant based on vehicle configuration data received from the vehicle configuration 320 in the control plane 310. The configuration data may also be retrieved by the vehicle control application on the mobile computer 118, where the configuration data for the vehicle variant and enables/disables Application Programming Interfaces (APIs) offered by service within the vehicle control application. Moreover, the vehicle variant-aware service mesh architecture 300 may be agnostic to whether an application is within executing the vehicle or cloud based.

The calibration component of proxy 341, 342, 343, and 344 retrieves calibration data for the vehicle variant based at least in part on information received from the vehicle configuration 320 in the control plane 310. The calibration component utilizes this information to apply certain default values for resources. For example, on a vehicle with configurable drive modes, a default drive mode could be applied when the service starts upon "Ignition RUN". The service component that implements the logic does not have to hard-code these values for different vehicle variants. This also permits the programming developed for services to be used in multiple vehicles, yet be customized to a particular vehicle variant.

Thus, a vehicle variant-aware service mesh architecture 300 for vehicle services utilizing service-oriented communication may secure priority levels provided that the priority component in the proxy 341, 342, 343, 344 is developed to the highest level (e.g., ASIL D). Additionally, a service proxy may be reused across vehicle variants provided that configuration and calibration components of the proxy can retrieve configuration and calibration data for the vehicle variant.

Figure 4:
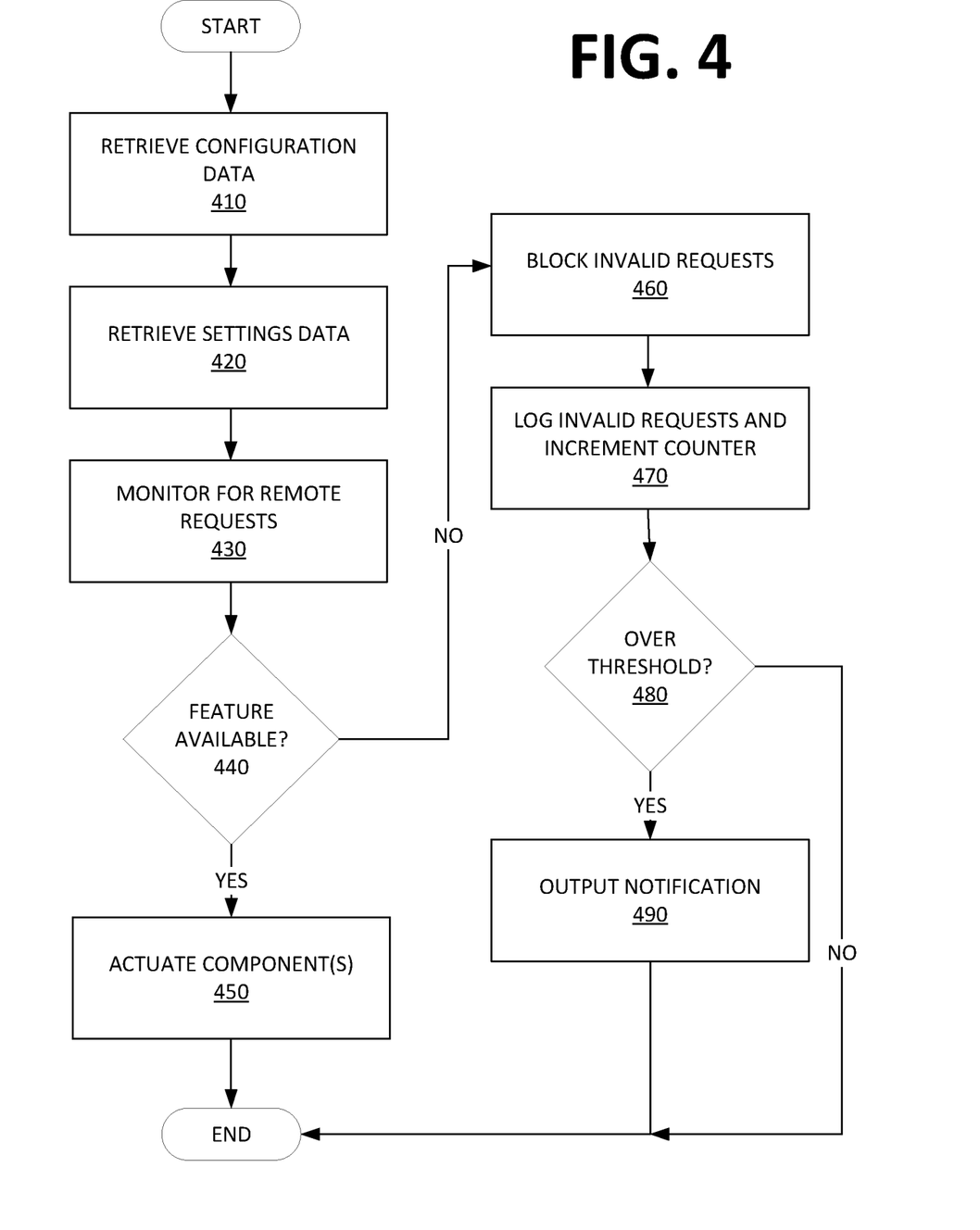
FIG. 4 is a flow diagram of an implementation.

FIG. 4 illustrates a flow diagram of an implementation of providing a service upon an instantiation of a vehicle control application (e.g., 321 or 322 in FIG. 3) in vehicle 102.

Upon instantiation of the vehicle control application, a processor, such as an ECU executing the App 2 322, executes instructions to retrieve configuration data 320 specifying one or more features available to the vehicle control application in the vehicle at block 410, and to retrieve settings data specifying one or more current settings for the control application at block 420.

Instructions are further executed to monitor a vehicle network for a request from a remote device for a selected feature of the control application in the vehicle at block 430, determine from the configuration data whether the selected feature is included in the one or more features available to the control application in the vehicle at block 440, and if the selected feature is included (determined YES), actuate a component in the vehicle based on the selected feature and the settings data at block 450. The processor executing these instructions may be in an ECU controlling the component to be actuated. For example, if the selected feature/actuator, such as actuator 231 in FIG. 2A, is controlled by a first service 221/331 having its own ECU, a network component of the service proxy 341 may monitor the vehicle network for a request from a remote device, the configuration component of the service proxy 341 may determine from the configuration data whether the selected feature is included, and first service 221/331 may control an actuator 231 based on the request and the settings from the calibration component of the service proxy 341.

If the feature is not included in the one or more features available to the control application in the vehicle at block 440 (determined NO), the invalid request is blocked at block 460, for example, by priority component of the service proxy 341.

Invalid requests may further be logged and/or a counter incremented at block 470.

At block 480, if the counter exceeds a threshold, a notification may be output at block 490 to assist in future software development. If the counter has not exceeded the threshold at block 480, the process may end without a notification being output.

Use of in response to, based on, and upon determining herein indicates a causal relationship, not merely a temporal relationship. The adjectives first and second are used throughout this document as identifiers and, unless explicitly stated otherwise, are not intended to signify importance, order, or quantity.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. Likewise, it further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A system comprising a computing device comprising a processor and a memory, the memory storing instructions executable by the processor, the instructions including instructions to:
   upon instantiation of a control application in a vehicle, retrieve (a) configuration data specifying one or more features available to the control application in the vehicle, wherein the configuration data includes priority data prioritizing among the one or more features, and (b) settings data specifying one or more current settings for the control application;
   monitor a vehicle network for request from a remote device for a selected feature of the control application in the vehicle;
   determine from the configuration data whether the selected feature is included in the one or more features available to the control application in the vehicle; and
   in response to the selected feature being included, based on the configuration data including the priority data, actuate a component in the vehicle based on the selected feature and the settings data.

2. The system of claim 1, wherein the configuration data is determined based on a type of the vehicle.

3. The system of claim 1, wherein the configuration data indicates a year, model, trim, and optional equipment of the vehicle.

4. The system of claim 1, wherein the settings data includes a value determined based on user input.

5. The system of claim 1, wherein the control application is executable by the computing device.

6. The system of claim 1, further comprising an electronic control unit (ECU) communicatively coupled to the computing device, wherein the control application is executable by the ECU.

7. The system of claim 6, wherein the ECU and the computing device are communicatively coupled in a mesh Ethernet network.

8. The system of claim 1, wherein the computing device is an electronic control unit (ECU) for a vehicle.

9. The system of claim 1, wherein the instructions further include instructions to block a request for the selected feature determined to be invalid based on the priority data.

10. The system of claim 1, wherein the instructions further include instructions to increment a count of requests for features that are determined to be invalid, and to output a notification upon the count meeting a predetermined threshold.

11. The system of claim 1, wherein the computing device includes a proxy to retrieve the configuration data, the settings data, and monitor the vehicle network.

12. The system of claim 11, wherein the computing device includes a proxy to prioritize communications and recommendations based upon priority level of a service or component.

13. The system of claim 1, wherein the control application is one of a plurality of control applications in the vehicle.

14. A method, comprising:
upon instantiation of a control application in a vehicle, retrieving (a) configuration data specifying one or more features available to the control application in the vehicle, wherein the configuration data includes priority data prioritizing among the one or more features, and (b) settings data specifying one or more current settings for the control application;
monitoring a vehicle network for request from a remote device for a selected feature of the control application in the vehicle;
determining from the configuration data whether the selected feature is included in the one or more features available to the control application in the vehicle; and
in response to the selected feature being included, based on the configuration data including the priority data, actuating a component in the vehicle based on the selected feature and the settings data.

15. The method of claim 14, wherein the configuration data is determined based on a type of the vehicle.

16. The method of claim 14, wherein the configuration data indicates a year, model, trim, and optional equipment of the vehicle.

17. The method of claim 14, wherein the settings data includes a value determined based on user input.

18. The method of claim 14, further comprising blocking a request for the selected feature determined to be invalid based on the priority data.

* * * * *